April 7, 1970  E. J. GORN  3,505,490
APPARATUS FOR THAWING OF FROZEN MATERIALS
Filed Oct. 7, 1966
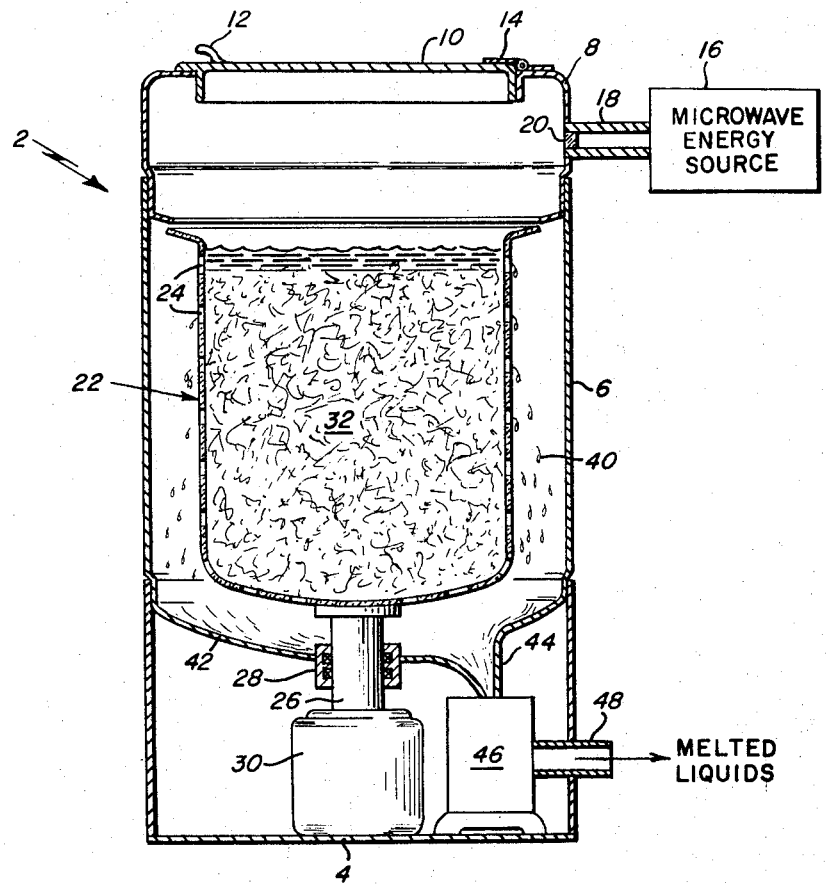
INVENTOR
ELMER J. GORN
BY
ATTORNEY

# United States Patent Office 3,505,490
Patented Apr. 7, 1970

3,505,490
APPARATUS FOR THAWING OF FROZEN MATERIALS
Elmer J. Gorn, Newton, Mass., assignor to Raytheon Company, Lexington, Mass., a corporation of Delaware
Filed Oct. 7, 1966, Ser. No. 585,160
Int. Cl. H05b 9/00
U.S. Cl. 219—10.55                              2 Claims

ABSTRACT OF THE DISCLOSURE

An apparatus for thawing frozen material comprising a perforated container made of a low dielectric loss tangent material housed within a metallic enclosure. Means are provided to supply microwave energy within the enclosure while the container is rotated at high speeds.

---

The present invention relates generally to thawing by a dielectric heating process frozen materials having a high liquid content and more particularly to apparatus and a method for rapid removal of the melted liquid to expose underlying layers of the frozen material to the heating energy.

In the methods of preparing selected edible food products it is sometimes found to be advantageous to freeze bulk quantities of the food product for storage and/or transportation to a distant processing center where subsequent operations may be performed. One example of an applicable food product may be found in the citrus fruit industry wherein large quantities of fruit pulp are frozen in bulk containers, conventionally drums or other suitable means holding quantities up to 55 gallons.

It is highly desirable in the processing of the large frozen mass of the edible food product to quickly thaw the material for subsequent packaging in smaller containers which are eventually utilized by the consumer. With the advent of radar during the war years a unique and novel source of high frequency oscillating electrical energy evolved with an availability of many millions of watts of energy for utilization in rapidly speeding up processing operations requiring thermal energy. Examples of such high frequency energy sources are the magnetron as well as the klystron oscillator which operate in the microwave region of the electromagnetic wave spectrum. For the purposes of this invention the term "microwave" shall be construed as defining very short electromagnetic waves having wavelengths in the order of sixty centimeters or less and frequencies in excess of three hundred megacycles per second.

The utilization of microwave energy in material processing has heretofore been hampered by the physical characteristics of materials in the frozen state. In the defrosting of such materials it has therefore been necessary to carry out the long and tedious process of allowing the frozen material mass to stand at room temperature until thawing is completed.

Microwave energy has been widely adopted in the processing of materials such as cooking and freeze drying of foods; drying or heat treating materials such as paper, wood, fabrics and industrial chemicals; as well as sterilization of drugs and medicines. In the application of dielectric heating by a microwave energy source in the defrosting of frozen materials the dielectric loss factors of ice, which are radically different from those of water, present problems which render the application of energy in this area very time consuming. The dielectric constant of water in the liquid state is approximately eighty while the dielectric constant of the same material in the solid state is many times less. Consequently, when a solid mass is exposed to the dielectric heating field small particles of water form throughout the mass and immediately attain the higher dielectric constant value of water. This results in a nonhomogeneous mass with individual heating rates of the trapped water increasing rapidly to the boiling point with the resultant buildup of high pressures. These high pressures are sufficient to cause rupture and explosion of the frozen mass material fibers. This mechanical violence may cause damage to a food product being thawed and therefore care must be taken to assure that the aforementioned steam pockets are not formed.

Additionally, as the outer periphery of the frozen mass is thawed the water forms a barrier impervious to electromagnetic energy and prevents penetration of the inner layers of the frozen mass by the heating energy. Rapid removal, therefore, of the melting fluids is desirable in the application of microwave heating energy in the processing of frozen material masses.

Accordingly, a primary object of the present invention is the provision of apparatus and a method for the application of microwave electromagnetic heating energy in the thawing of frozen masses having a substantial liquid content.

Another object of the present invention is the provision of apparatus and a method for the rapid removal of melting fluids while a frozen mass having a substantial liquid content is radiated with microwave heating energy.

Other objects, features and advantages of the present invention will be evident after consideration of the following detailed description together with the accompanying drawing in which the figure is a vertical cross-sectional view of an exemplary embodiment of the invention.

Referring to the figure, an illustrative embodiment of the invention is shown. The apparatus indicated generally by the numeral 2 includes a base member 4 which supports body member 6 which may be of a cylindrical configuration. Both the base and body members may be fabricated of a conductive material and when the apparatus is utilized for edible food products any of the conventionally used well known metals such as stainless steel may be employed. Body member 6 in turn supports an enclosure member 8 which is provided in its upper wall with a door 10 having a handle 12 and a hinge 14.

High frequency electromagnetic energy in the microwave region of the spectrum is generated from a suitable conventional source indicated generally by the reference numeral 16 coupled to the apparatus 2 by transmission line 18. A microwave permeable member is disposed at one end of the wave transmission line 18 where it is coupled through an aperture in the wall of enclosure member 8.

A well known electron discharge device of the magnetron or klystron type is suggested for the microwave energy source. In view of the familiarity of those skilled in the art with such devices specific details have been omitted in the interest of clarity as these details may take any conventional form. For the purposes of the use intended of subject apparatus, microwave energy is radiated within the device in a complex mode to prevent the setting up of standing waves. The chamber defined by the base, body and enclosure members will thereby be radiated with microwave thermal energy and in the utilizing of such energy in the thawing of frozen material mases the chamber is preferably nonresonant. It may also be noted that any of the conventional means for feeding microwave energy may be utilized such as, for example, coaxial conductors having the center conductor disposed partially within the chamber to be radiated.

A container 22 having a tub configuration is rendered foraminous by a plurality of substantial openings in a major portion of the peripheral walls to facilitate the ejection of the thawed liquids and of some solids depending on the product being processed. In keeping with the teachings of the invention the material forming the container 22 is preferably selected of a material having a low dielectric loss tangent. In the art this term refers to the product of dielectric constant multiplied by the power factor of any specific material and is further amplified in the text "Induction & Dielectric Heating" by J. Wesley Cable, Reinhold Publishing Corp., New York, pp. 327–331. Illustratively, such materials as nylon, Teflon and "Plexiglas," a registered trademark, may be utilized to permit heating of the contained frozen mass by the microwave heating energy without attenuation of the electromagnetic waves by the material. In accordance with the teachings of the present invention rotation of the frozen mass during the microwave heating cycle is attained by supporting container 22 on a drive shaft 26 with an appropriate sealed bearing assembly 28. Motor 30 housed within the base member 4 provides the actuation means for rotation of the container 22.

Access to the interior of the apparatus and container 22 through door 10 permits the introduction of the frozen mass 32 which for the purposes of this description will be citrus fruit pulp which may be packaged in drums containing approximately 55 gallons. The contents of such drums may be readily emptied into the container 22 within a short time after standing at room temperature. In the method of the invention the microwave energy is radiated within the apparatus and the container 22 simultaneously rotated at high speeds to centrifuge the thawed liquids as well as any of the fibrous pulp contained within the frozen block being processed. By means of the centrifuge action the melting products on the outer peripheral walls of the frozen mass 32 are removed continuously to expose underlying layers to the microwave heating energy. Droplets 40 are illustratively shown as passing through the perforations 24 and are collected by bottom wall 42 having an exit aperture 44 coupled to exhaust pump 46. Conduit 48 coupled to exhaust pump 46 will allow for rapid ejection and removal of the melted fluids for subsequent processing and packaging.

The invention is concerned primarily with frozen masses of materials having a substantial liquid content. Such materials as frozen fruits commonly have a 65–85% water content while meats, shucked fish products, eggs and milk are in the range of 50–87%.

In such frozen masses thawing will result quite rapidly along the outer surfaces of the mass as the temperature of the trapped frozen liquids is raised. Rapid removal of the thawed liquids, therefore, by the centrifuge action prevents shielding of the underlying layers from the microwave energy by the outer layer of melted liquids. In many processing applications it may be convenient for the frozen mass to be packaged in a container having a plurality of perforations which are encased by a moisture-resistant covering during storage and transportation. When the mass is to be thawed the outer protective cover may be removed and the perforated container or cartridge inserted within the apparatus for rotation and centrifuge action. A material ideally suited for such a cartridge container would be cardboard having a low dielectric loss tangent. Other materials such as polyethylene or similar synthetic resinous materials will suggest themselves to those skilled in the art in the varied applications for which the present invention is intended.

The primary advantage of the present invention is readily apparent, particularly to the commercial users of large quantities of food products, say, for example, ice cream or bakery products. The frozen fruit products have heretofore been thawed by very slow time consuming processes sometimes requiring many hours with resultant deleterious effects in taste and color. The application of microwave heating energy in the thawing of frozen masses will result in complete thawing within minutes utilizing the teachings of rapid rotation of the frozen mass during the heating cycle.

Foraminous container 22 is preferably designed to be readily removable at any time for cleaning purposes, particularly where edible food products are processed. In addition, the interior wall surfaces of the apparatus may be coated with materials such as porcelain or Teflon to further enhance the cleanliness of the processing operations.

The microwave energy feed arrangement illustrated herein may also be modified and altered in displacement to suit the needs of the user. Any and all modifications or alterations are considered to fall within the precepts of the invention and accordingly it is expressly understood that the invention is to be limited solely by the spirit and scope of the appended claims.

What is claimed is:
1. A device for thawing frozen materials having a high liquid content by microwave heating energy comprising:
   a metallic enclosure;
   means for radiating high frequency electromagnetic microwave energy within said enclosure;
   a container member of a low dielectric loss tangent material rotatably supported within said enclosure;
   said container member defining a plurality of perforations over a major portion of its peripheral walls;
   and means for rotating said container member at high rates of speed when said enclosure is radiated with microwave energy.
2. A device in accordance with claim 1 wherein said container member is adapted to be removed when said means for radiating microwave energy are not energized.

References Cited

UNITED STATES PATENTS

| | | | |
|---|---|---|---|
| 2,977,234 | 3/1961 | Wenzelberger | 99—205 |
| 3,182,166 | 5/1965 | Bohm et al. | 219—10.55 |
| 3,283,113 | 11/1966 | Smith | 219—10.55 |
| 3,336,142 | 8/1967 | Lawson | 99—192 |

A. LOUIS MONACELL, Primary Examiner

S. B. DAVIS, Assistant Examiner

U.S. Cl. X.R.

99—1, 234